A. MAIRE.
SPECIAL DESIGN FOR BALL BEARINGS AND THRUST BEARINGS.
APPLICATION FILED OCT. 27, 1917.
1,340,663. Patented May 18, 1920.
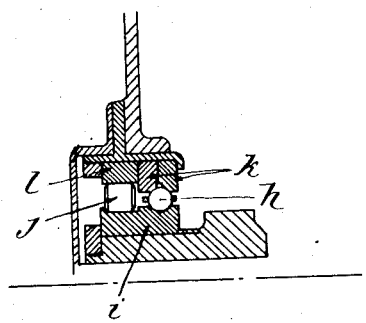
Inventor
Auguste Maire
by Otto Munn
his Attorney

UNITED STATES PATENT OFFICE.

AUGUSTE MAIRE, OF ARGENTEUIL, FRANCE, ASSIGNOR TO SOCIETE LORRAINE DES ANCIENES ETABLISSEMENTS DE DIETRICH & CIE. DE LUNEVILLE, OF PARIS, FRANCE.

SPECIAL DESIGN FOR BALL-BEARINGS AND THRUST-BEARINGS.

1,340,663.   Specification of Letters Patent.   Patented May 18, 1920.

Application filed October 27, 1917. Serial No. 198,749.

*To all whom it may concern:*

Be it known that I, AUGUSTE MAIRE, citizen of the Republic of France, residing at Route de Bezons, Argenteuil, Seine and Oise, in the Republic of France, have invented new and useful Improvements in Special Designs for Ball-Bearings and Thrust-Bearings, of which the following is a specification.

The object of the present invention is to provide an improved thrust bearing, the construction of which is illustrated in the accompanying drawing in which the figure is a sectional view of said bearing.

Referring to the drawing $i$ denotes a central ring or race member having two adjacent raceways formed in one face thereof. One of these raceways which is adapted to resist radial pressure receives rollers $j$ as shown or balls and the other which is adapted to resist axial pressure receives balls $h$. Opposite the race member $i$ is a composite race member comprising a ring $l$ and a pair of adjacent rings $k$. The ring $l$ has a race formed therein for the radial pressure rollers or balls $j$ and the rings $k$ have a raceway formed at the meeting line of these two rings in which the balls $h$ for axial pressure are received. Both the rings $k$ may be quite independent of the ring $l$ or the ring $k$ adjacent the ring $l$ may be integral with said ring the other ring $k$ being independent. The rings are held in position by any usual means.

Having now described my invention, what I claim as new and desire to secure by Letters Patent is:

1. A thrust ball bearing system containing, in combination, a first ring, a second ring concentric with the first ring and formed by the assemblage of three independent pieces, there being a plurality of adjacent rolling ways upon each of these two rings the rolling ways of one ring being opposite those of the other; rolling elements disposed upon said rolling ways; means for constant spacing of said rolling elements; and means for holding together the pieces of the second ring; substantially as described and for the purpose set forth.

2. A thrust ball bearing system containing, in combination, a first ring, there being two rolling ways upon said ring, a second ring concentric with the first ring and formed by the assemblage of three independent pieces, there being two rolling ways upon this second ring, one of these rolling ways being situated upon the assemblage plane of two of the three pieces composing the ring, rolling elements disposed in said rolling ways, means for constant spacing of said rolling elements and means for holding together the pieces of the second ring, substantially as described and for the purpose set forth.

3. A thrust ball bearing, comprising a race member having a plurality of adjacent races therein, a second race member concentric with the first and comprising a composite portion having a race formed at the meeting line of its members and a second race adjacent thereto, the races of said race members respectively being opposite each other, and rolling elements in said races.

4. A ball or roller bearing comprising a race member having two adjacent races therein, one for radial pressure and the other for axial pressure, a composite race member concentric with the first and having a radial pressure race and an axial pressure race opposite the respective races above mentioned, the said composite race member being divided along the axial plane of the axial pressure race, and rolling members in said races.

In testimony whereof I have signed my name to this specification in the presence of two subscribing witnesses.

AUGUSTE MAIRE.

Witnesses:
LOUIS MOSES,
CHAS. P. PRESSLY.